(12) United States Patent
Xiong et al.

(10) Patent No.: US 10,935,090 B2
(45) Date of Patent: Mar. 2, 2021

(54) BRAKE ASSEMBLY AND SERVO HAVING THE SAME

(71) Applicant: UBTECH Robotics Corp, Shenzhen (CN)

(72) Inventors: Youjun Xiong, Shenzhen (CN); Youpeng Li, Shenzhen (CN); Hongyu Ding, Shenzhen (CN); Meichun Liu, Shenzhen (CN); Jianxin Pang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 7 days.

(21) Appl. No.: 16/368,879

(22) Filed: Mar. 29, 2019

(65) Prior Publication Data

US 2020/0208691 A1    Jul. 2, 2020

(30) Foreign Application Priority Data

Dec. 29, 2018 (CN) .......................... 201811640689.9

(51) Int. Cl.
| | |
|---|---|
| *F16D 63/00* | (2006.01) |
| *F16D 55/226* | (2006.01) |
| *F16D 65/12* | (2006.01) |
| *F16D 129/10* | (2012.01) |

(52) U.S. Cl.
CPC .......... *F16D 55/226* (2013.01); *F16D 65/121* (2013.01); *F16D 65/127* (2013.01); *F16D 2129/10* (2013.01); *F16D 2200/0056* (2013.01)

(58) Field of Classification Search
CPC .......... B60T 1/005; B60T 1/062; B60T 1/067; F16D 63/006; F16D 49/00; F16D 2121/22; F16D 2127/06; F16H 63/3416; F16H 63/3425; F16H 63/3433; B25J 19/0004
See application file for complete search history.

(56) References Cited

U.S. PATENT DOCUMENTS

| | | | | |
|---|---|---|---|---|
| 2,317,344 A | * | 4/1943 | Hood | .................... F02N 15/065 |
| | | | | 290/38 A |
| 2,890,581 A | * | 6/1959 | Lewis | .................... B60T 1/005 |
| | | | | 70/248 |

(Continued)

FOREIGN PATENT DOCUMENTS

| | | |
|---|---|---|
| CN | 101128685 A | 2/2008 |
| CN | 208010807 U | 10/2018 |

(Continued)

*Primary Examiner* — Bradley T King
*Assistant Examiner* — Stephen M Bowes

(57) ABSTRACT

A brake assembly for a servo including a motor includes: a brake disk fixed to and rotatable together with the output shaft of the motor of the servo, the brake disk having a lateral wall defining at least one opening; and a linear motion actuator including a plunger and an elastic member. The plunger sides from a first position where a first end of the plunger is received in the at least one opening to a second position where the first end of the plunger is disengaged from the brake disk when the linear motion actuator is energized. The elastic member applies an elastic force to cause the plunger to slide from the second position to the first position when the linear motion actuator is deenergized so as to stop rotation of the output shaft of the motor.

9 Claims, 4 Drawing Sheets

(56) References Cited

U.S. PATENT DOCUMENTS

| | | | | |
|---|---|---|---|---|
| 5,766,026 A * | 6/1998 | Cooper | ............... | B60R 16/0239 |
| | | | | 361/736 |
| 2002/0040839 A1 * | 4/2002 | Thyselius | ........... | F16H 63/3475 |
| | | | | 192/219.5 |
| 2007/0170004 A1 * | 7/2007 | Ito | ............................. | B66B 5/00 |
| | | | | 187/254 |
| 2010/0051395 A1 * | 3/2010 | Sano | ....................... | B60T 8/885 |
| | | | | 188/162 |
| 2015/0232070 A1 * | 8/2015 | Sten | ...................... | B60W 10/10 |
| | | | | 192/219.5 |
| 2018/0073584 A1 * | 3/2018 | Tsukamoto | .............. | F16D 65/18 |
| 2018/0244498 A1 * | 8/2018 | Fauconnet | ............ | B66B 13/165 |
| 2018/0345935 A1 * | 12/2018 | Yasui | ....................... | B60T 13/74 |

FOREIGN PATENT DOCUMENTS

| | | | | |
|---|---|---|---|---|
| KR | 101935030 B1 * | 1/2019 | ............ | F16D 65/18 |
| WO | WO-2017029531 A1 * | 2/2017 | ................ | B66B 9/00 |

\* cited by examiner

BRAKE ASSEMBLY AND SERVO HAVING THE SAME

CROSS REFERENCE TO RELATED APPLICATIONS

This application claims priority to Chinese Patent Application No. 201811640689.9, filed Dec. 29, 2018, which is hereby incorporated by reference herein as if set forth in its entirety.

BACKGROUND

1. Technical Field

The present disclosure generally relates to servos, and particularly to a brake assembly and a servo including the brake assembly.

2. Description of Related Art

Servos are key components of robots. A servo typically includes a housing, a motor, a reducer, etc. Many servos are not equipped with brakes, and motors of the servos cannot be stopped quickly after when no power is applied thereto. Although brakes of conventional motors are mature, they are complex in structure and bulky. Furthermore, friction pads of the conventional brakes require that the maximum rotational speed of the motors is not greater than 6000 rpm. The life of the brakes is reduced due to the wear of the friction pads.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
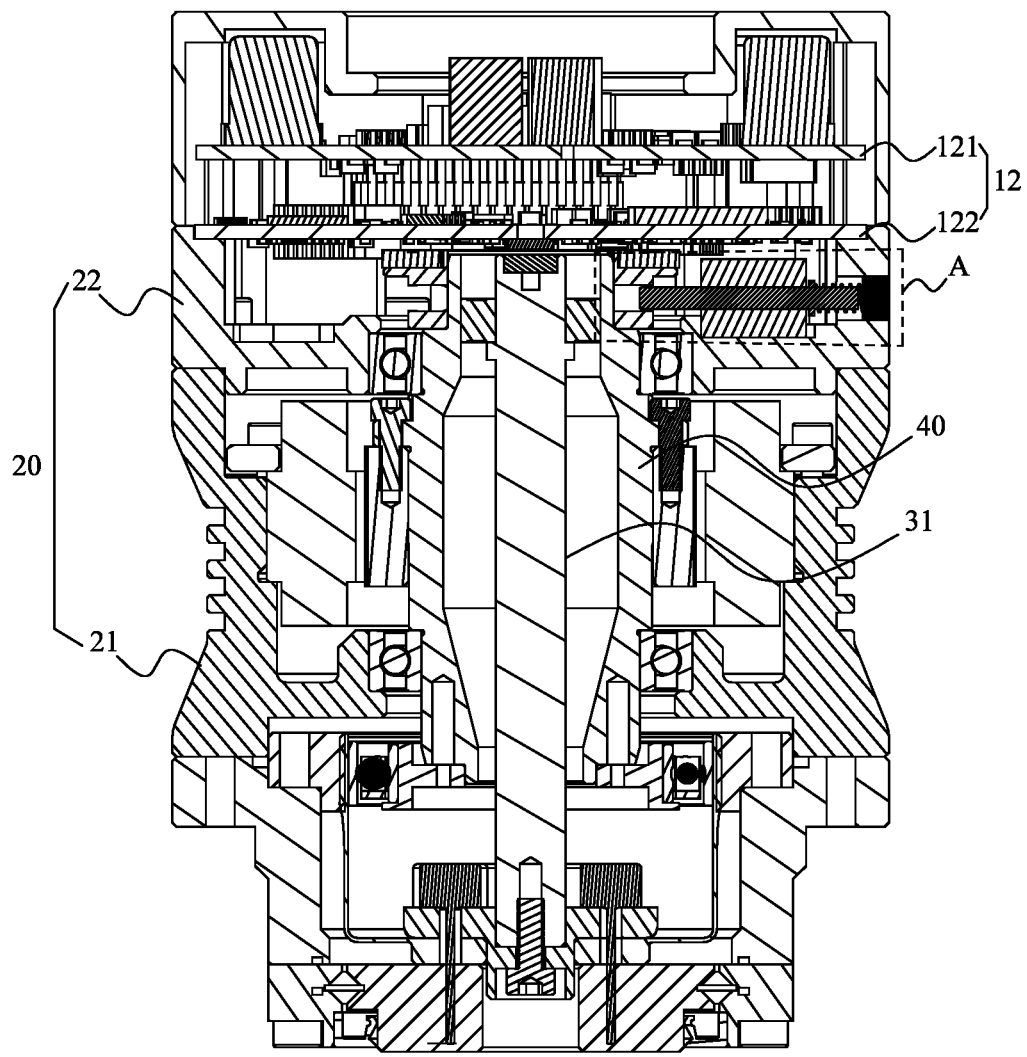
FIG. 1 is a cross sectional view of a servo according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
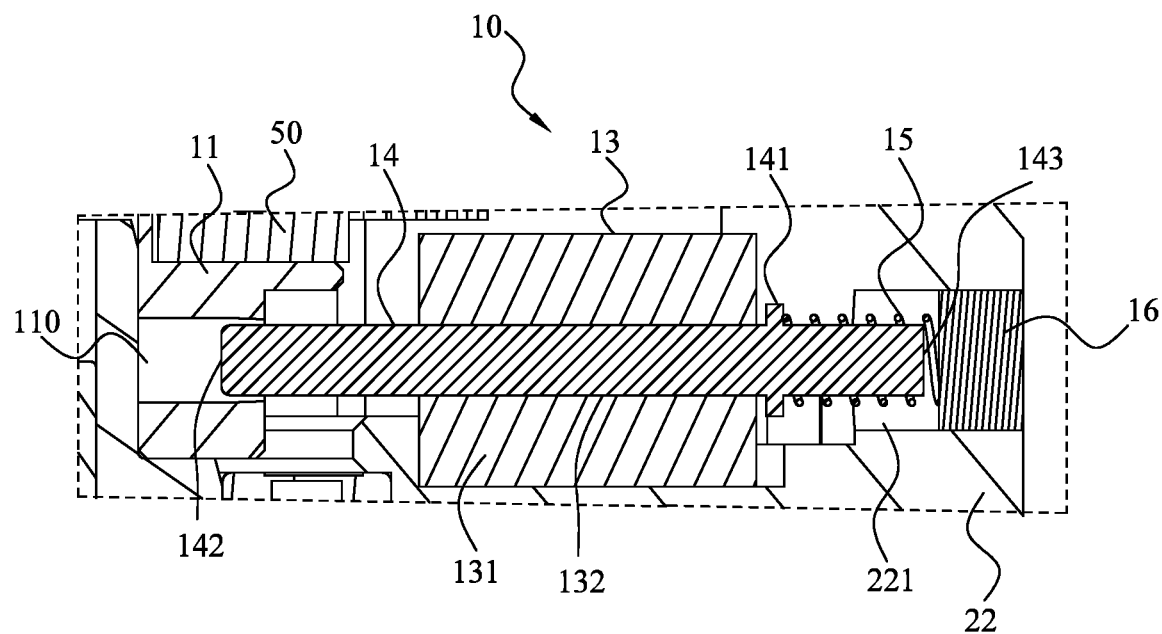
FIG. 2 is an enlarged view of area A in FIG. 1.
Figure 4:
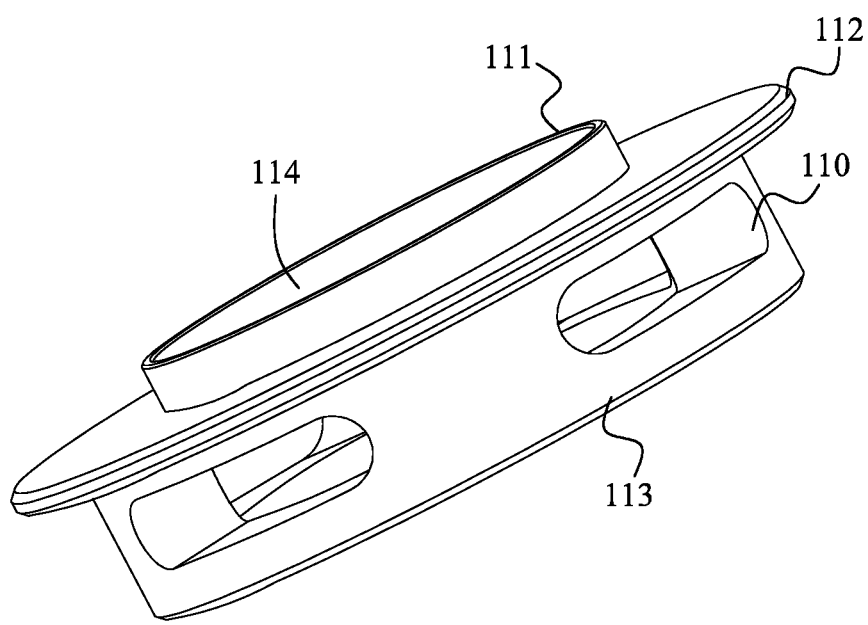
FIG. 4 is an isometric view of a brake disc of FIG. 2.

Referring to FIGS. 1, 2 and 4, in one embodiment, a brake assembly 10 for a servo includes a brake disk 11, a control circuit board 12, and a linear motion actuator 13. The brake disk 11 is arranged around an output shaft 40 of a motor of the servo. The brake disk 11 is, coaxial with and rotatable together with the output shaft 40. The brake disk 11 includes a lateral wall defining at least one opening 110. The linear motion actuator 13 is electrically coupled to the control circuit hoard 12, and executes commands from the control board 12. The linear motion actuator 13 includes a plunger 14 and an elastic member 15. The linear motion actuator 13 includes a main body 131 defines a through hole 132 emending in a direction perpendicular to the output shaft 40 of the motor. The plunger 14 has a first end 142 and a second end 143 opposite the first end 142. The plunger 14 passes through the through hole 132, with the first end 142 and the second end 143 located outside the through hole 132. The plunger 14 slides from a first position where the first end 142 is received in the at least one opening 110 to a second, position where the first end 142 is disengaged from the brake disk 11 when the linear motion actuator 13 is, energized. The elastic member 15 is arranged around the plunger 14 and located away from the brake disk 11. The elastic member 15 is used to apply an elastic force to cause the plunger 14 to slide from the second position to the first position when the linear motion actuator 13 is deenergized so, as to stop rotation of the output shaft 40 of the motor, In the embodiment, the plunger 14 is a cylinder that moves in a straight line, and the main body 131 of the linear motion actuator 13 drives the plunger 14 to move. In the embodiment, the main body 13 includes coil winding and when the coil wining is energized with electric current it behaves like an electromagnet. The plunger 14 located inside the coil winding is then attracted to move from the first position to the second position, which frees the output shaft 40 from the restriction of the plunger 14.

The working principle of the brake assembly 10 is as follows: When a control circuit on the control circuit board 12 receives an "ENABLE" command, the motor of the servo is started and the output shaft 40 starts to rotate. Then the control circuit on the control circuit board 12 controls the plunger 14 to overcome the elastic force of the elastic member 15, causing the first end 142 of the plunger 14 to move out of opening 110 of the brake disk 11, which frees the output shaft 40 from the restriction of the plunger 14. When the control circuit on the control circuit board 12 receives an "OFF" command or is deenergized, the plunger 14 moves toward the brake disk 11 due to the elastic force of the elastic member 15. When the first end 142 of the plunger 14 moves into the opening 110, the rotation of the output shaft 40 is stopped.

In order to prevent the brake disk 11 from interfering with the normal movement of the plunger 14, the output shaft 40 is usually first rotated by a certain angle so as to allow the first end 142 of the plunger 14 points to the center of the opening 110. The first end 142 of the plunger 14 can then move into the opening 110 without bumping into the brake disk 11. The angle can be determined by a code disc 50 of a motor encoder located above the brake disk 11.

The brake assembly 10 of the embodiment is small in size and simple in structure, and fully utilizes the internal space of the servo without increasing the internal space. The brake assembly 10 does not require that the maximum rotational speed of the motor is not greater than a preset value. That is, the maximum rotational speed of the motor is not limited. Furthermore, since no frictional pads are used, there is no wear in the brake disc 11.

In one embodiment, the brake assembly 10 further includes an encoder having the code disc 50. The code disc 50 is arranged around the brake disc 11. The bottom of the code disc 50 rest on a side of a second section of the brake disc 11 which will be described in detail later.

In one embodiment, the brake assembly 10 further includes a proximity sensor 16 disposed at the second end 143 of the plunger 14 remote from the brake disk 11 and is coaxial with the plunger 14. The proximity sensor 16 is spaced apart from the second end 143 of the plunger 14. The proximity sensor 16 detects presence of the plunger 14 when the plunger 14 has moved to the second position. In the embodiment, reliability of system can be increased by using the proximity sensor 16. In the embodiment, the proximity sensor 16 is electrically connected to the control circuit board 12, and transmits detection information to a controller on the control circuit board 12. The controller controls the linear motion actuator 13 according to the received detection information. For example, when the proximity sensor 16 detects that the plunger 14 is not completely disengaged from the opening 110, the linear motion actuator 13 can be controlled by the controller to generate a large electromotive force, thereby providing a large force to the plunger 14 so as to drive the first end 142 of the plunger 14 to move of the opening 110 quickly.

In one embodiment, the linear motion actuator 13 includes the main body 131 defines the through hole 132 extending in a direction perpendicular to the output shaft 40 of the motor. The plunger 14 passes through the through hole 132, with the first end 142 and the second end 143 located outside the through hole 132. Thus, the plunger 14 extends in a direction perpendicular to a direction in which the output shaft 40 extends. In the embodiment, the plunger 14 is in a clearance fit with the through hole 132 to facilitate linear motion thereof. In the embodiment, the cross-section of the through hole can be circular or polygonal, which is preferably the same shape as the plunger 14.

Figure 3:
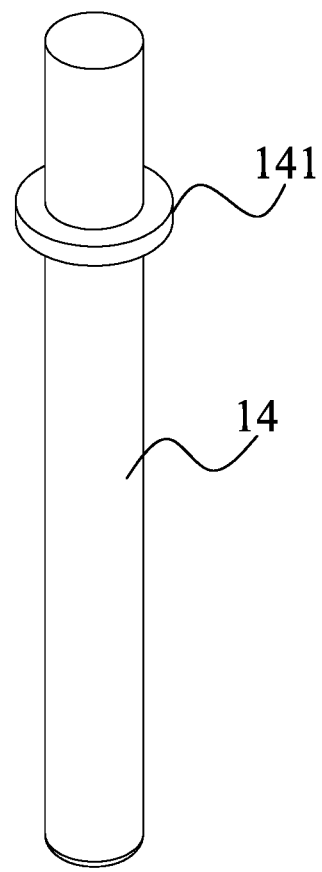
FIG. 3 is isometric view of a plunger of FIG. 2.

Referring to FIG. 3, in one embodiment, the plunger 14 includes a projection 141 adjacent to the second end 143, and one end of the elastic member 15 abuts against the projection 141. The other opposite end of the elastic member 15 abuts against the proximity sensor 16. In an alternative embodiment, the other end of the elastic member 15 can be fixed to the housing of the servo. When the plunger 14 slides to the first position shown in FIG. 2, the projection 141 is located adjacent to one end of the main body 131. With opposite ends of the elastic member 15 abutting against the projection 141 and the proximity sensor 16, the elastic member 15 is compressed when the plunger 14 slides to the second potion, and can rebound and push the plunger 14 when the linear motion actuator 13 is deenergized. In one embodiment, the plunger 14 and the projection 141 can be integrally formed so as to facilitate cost saving and simplification of structure.

In one embodiment, the linear motion actuator 13 is soldered to the control circuit board 12. Specifically, a first pin (not shown) and a second pin (not shown) are disposed on a side of the linear motion actuator 13 adjacent to the control circuit board 12. The first pin and the second pin are soldered to the control circuit board 12 so as to realize the electrical connection between the linear motion actuator 13 and the control circuit board 12.

In one embodiment, the control circuit board 12 includes a first control circuit board 121 and a second control circuit board 122. The first control circuit board 121 and the second control circuit board 122 are parallel and fixedly connected to each other. In the embodiment, the second control circuit board 122 is disposed adjacent to the linear motion actuator 13. The linear motion actuator 13 is soldered to and electrically connected to the second control circuit board 122, and controlled by the second control circuit board 122. In other embodiments, the control circuit board 12 may include more sub circuit boards according to actual needs, and may include only one sub circuit board.

Referring to FIG. 4, in one embodiment, the brake disk 11 includes a first section 111, a second section 112 and a third second 113. The second section 112 is connected to and sandwiched between the first section 111 and the third section 113. The at least one opening 110 is defined in the third section 113. The code disc 50 is arranged around the outer lateral surface of the first section 111 of the brake disk 11, and the lower end surface of the code disc 50 abuts against an upper side of the second section 112 of the brake disk 11. In other embodiments, the shape of the opening 110 may be formed according to needs.

The first section 111, the second section 112, and the third section 113 are cylindrical, the second section 112 has a diameter greater than a diameter of the third section 113, and the diameter of the third section 113 is greater than a diameter of the first section 111. In the embodiment, the first section 111, the second section 112, and the third section 113 are integrally formed so as to facilitate cost saving and simplification of structure.

In one embodiment, the at least one opening 110 is four in number, and the four openings 110 are evenly arranged in a circumferential direction of the third section 113. The four openings 110 have the same circumferential length. In other embodiments. the number of the openings 110 may vary according to need. The circumferential length of the openings 110 may be different.

In one embodiment, the brake disk 11 defines a through hole 114 through which the brake disk 11 is arranged around the output shall 40 of the motor. The openings 110 extend from an outer lateral surface of the third section 113 and communicates with the through hole 114. In other embodiment, the openings 110 may not extend to the inner lateral surface of the through hole 114. That is, the openings 110 are blind holes having a sufficient depth that can receive the first end 142 of the plunger 14 to stop rotation of the output shaft 40.

Referring to FIGS. 1-4, in one embodiment, a servo includes the brake assembly as described above. The servo further includes a housing 20, the motor, a speed reducer (not shown), and the like. The motor is mounted in the housing 20, and includes the output shaft 40 whose end extend out of the housing 20. The speed reducer is fixed to one end of the output shaft 40 away from the brake assembly 10. The housing 20 includes a middle case 21 and an end cap 22 connected to an end of the middle case 21 away from the speed reducer. In the embodiment, a recess is formed in the inner side of the end cap 22 for receiving the proximity sensor 16, and one end of the plunger 14 can be received into the recess.

The servo further includes an encoder shaft 31 that pass through the output shaft 40, and the encoder disc 50 is arranged around the output shaft 40 adjacent to one end thereof.

It should be noted that the motor further includes a stator and a rotor, and the servo further includes other common components in addition to the above components, and will not be described in detail herein.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A brake assembly for a servo comprising a motor, the motor comprising an output shaft, the brake assembly comprising:

a brake disk fixed to and rotatable together with the output shaft of the motor of the servo, the brake disk comprising a lateral wall defining at least one opening; and a linear motion actuator comprising a plunger and an elastic member, the plunger being configured to slide from a first position where a first end of the plunger is received in the at least one opening to a second position where the first end of the plunger is disengaged from the brake disk when the linear motion actuator is energized, and the elastic member being configured to apply an elastic force to cause the plunger to slide from the second position to the first position when the linear motion actuator is deenergized so as to stop rotation of the output shaft of the motor, wherein the plunger extends in a direction that is perpendicular to a direction in which the output shaft of the motor extends;

wherein the brake disk comprises a first section, a second section and a third second, the second section is connected to and sandwiched between the first section and the third section, the at least one opening is defined in the third section;

the brake disk defines a through hole through which the brake disk is arranged around the output shaft of the motor, the at least one opening extends from an outer lateral surface of the third section to and communicates with the through hole.

2. The brake assembly of claim 1, further comprising a proximity sensor configured to detect presence of the plunger when the plunger has moved to the second position.

3. The brake assembly of claim 1, wherein the linear motion actuator comprises a main body that defines a through hole extending in a direction perpendicular to the output shaft of the motor, the plunger comprises a second end opposite the first end, the plunger passes through the through hole, with the first end and the second end located outside the through hole.

4. The brake assembly of claim 1, wherein the plunger comprises a projection adjacent to the second end, and one end of the elastic member abuts against the projection.

5. The brake assembly of claim 1, further comprising a control circuit board, where the linear motion actuator comprises a first pin and a second pin that are soldered to the control circuit board.

6. The brake assembly of claim 1, wherein the at least one opening is four in number, and the four openings are evenly arranged in a circumferential direction of the third section.

7. The brake assembly of claim 1, wherein the second section has a diameter greater than a diameter of the third section, and the diameter of the third section is greater than a diameter of the first section.

8. A servo comprising a motor that comprises an output shaft, and a brake assembly, the brake assembly comprising:

a brake disk fixed to and rotatable together with the output shaft of the motor of the servo, the brake disk comprising a lateral wall defining at least one opening; and a linear motion actuator comprising a plunger and an elastic member, the plunger being configured to slide from a first position where a first end of the plunger is received in the at least one opening to a second position where the first end of the plunger is disengaged from the brake disk when the linear motion actuator is energized, and the elastic member being configured to apply an elastic force to cause the plunger to slide from the second position to the first position when the linear motion actuator is deenergized so as to stop rotation of the output shaft of the motor, wherein the plunger extends in a direction that is perpendicular to a direction in which the output shaft of the motor extends;

wherein the brake disk comprises a first section, a second section and a third second, the second section is connected to and sandwiched between the first section and the third section, the at least one opening is defined in the third section;

the brake disk defines a through hole through which the brake disk is arranged around the output shaft of the motor, the at least one opening extends from an outer lateral surface of the third section to and communicates with the through hole.

9. The servo of claim 8, wherein the linear motion actuator comprises a main body that defines a through hole extending in a direction perpendicular to the output shaft of the motor, the plunger comprises a second end opposite the first end, the plunger passes through the through hole, with the first end and the second end located outside the through hole.

* * * * *